United States Patent [19]
Yanutola

[11] Patent Number: 5,270,119
[45] Date of Patent: Dec. 14, 1993

[54] ANTI-SKID COMPOSITION

[75] Inventor: Michael J. Yanutola, Tega Cay, S.C.

[73] Assignee: PPG Industries, Inc., Pittsburgh, Pa.

[21] Appl. No.: 770,066

[22] Filed: Oct. 2, 1991

Related U.S. Application Data

[63] Continuation-in-part of Ser. No. 565,535, Aug. 10, 1990, abandoned.

[51] Int. Cl.$^5$ .............................................. B32B 5/16
[52] U.S. Cl. ..................................... 428/507; 428/511; 428/537.5; 523/149; 524/376; 524/562; 526/318.45; 526/329.2
[58] Field of Search ............... 523/149; 524/376, 562; 526/318.45, 329.2; 428/507, 511, 537.5

[56] References Cited

U.S. PATENT DOCUMENTS

| | | | |
|---|---|---|---|
| 2,793,136 | 5/1957 | Root | 523/150 |
| 3,125,453 | 3/1964 | Simonds | 106/10 |
| 3,258,441 | 6/1966 | McEwan et al. | 260/29.6 |
| 3,527,146 | 9/1970 | Garling | 523/150 |
| 3,962,168 | 6/1976 | Edwards | 524/501 |
| 4,109,041 | 8/1978 | Tellman | 428/147 |
| 4,418,111 | 11/1983 | Carstens | 428/145 |
| 4,501,783 | 2/1985 | Hiragami et al. | 428/147 |
| 4,753,831 | 6/1988 | Hosoyamada et al. | 428/35 |
| 4,801,643 | 1/1989 | Craig | 524/832 |
| 4,980,024 | 12/1990 | Payne et al. | 162/135 |

*Primary Examiner*—Paul R. Michl
*Assistant Examiner*—John J. Guarriello
*Attorney, Agent, or Firm*—Irwin M. Stein

[57] ABSTRACT

Disclosed are cellulosic sheet material, e.g., liner board, coated with an aqueous emulsion of polystyrene or styrene-alkyl acrylate copolymers, which when dried impart, inter alia, skid or slip resistant properties to the sheet material. The polymer has a glass transition temperature of, for example, 70° C. to 100° C. and an average particle size of from 70 to 150 nanometers.

20 Claims, No Drawings

ANTI-SKID COMPOSITION

CROSS REFERENCE TO RELATED APPLICATION

The application is a continuation-in-part application of application Ser. No. 07/565,535, filed Aug. 10, 1990, for ANTI-SKID COMPOSITION.

DESCRIPTION OF THE INVENTION

The present invention relates to compositions for coating fibrous cellulosic sheet materials to enhance the surface friction (anti-skid properties) of the sheet material. In particular, this invention relates to the coating of paper in the form of so-called liner board used in the manufacture of corrugated boxes.

Paper products, e.g., liner board, corrugated cardboard, and the like are increasingly being made in whole or in part from recycle fiber. Since recycle fibers are considerably shorter than virgin paper fibers and since they are often contaminated with waxes, adhesives and other coating residues, they have a low coefficient of friction or slip-resistance. Containers made from such material have more of a tendency to slip against each other due to their slicker surfaces. There are circumstances where it is necessary to employ paper products having enhanced surface friction. Paperboard liner for cardboard (corrugated boxes) is an example. In the case of shipping or otherwise transporting stacked boxes containing expensive goods or goods easily susceptible to damage in the event the stack of boxes topples, it is desirable to increase the resistance to sliding of such boxes against each other.

It has been proposed that a surface coating of colloidal silica be applied to the outer surface of liner board to increase its slip resistance. However, colloidal silica tends to build-up on calendar rolls, and when dry is prone to slough-off the liner board surface, thereby causing dusting problems. Anti-skid or slip-resistant coating compositions comprising colloidal silica in admixture with urea (U.S. Pat. No. 4,418,111) and interpolymer latices (U.S. Pat. No. 3,258,441) have been proposed. However such coating compositions do not entirely eliminate the problems inherent in the use of colloidal silica.

It is, therefore, the principal object of this invention to provide a coating composition, which when surface coated on cellulosic sheets, e.g., liner board, imparts excellent slip resistance thereto, which coating composition is free of colloidal silica and consequently the foregoing problems attendant with its use.

It has now been discovered that a colloidal silica-free aqueous emulsion of polymerized monovinyl aromatic monomer having particular physical properties may be used to coat cellulosic sheets, such as liner board, to enhance its surface friction, and to provide a clear coating. The particles of the emulsion polymer are sufficiently soft to adhere to the cellulosic sheet, but also are sufficiently hard to resist scaling or flaking when dry due to contact from another coated sheet.

DETAILED DESCRIPTION OF THE INVENTION

The present invention relates to a colloidal silica free aqueous composition, which composition, when surface coated on cellulosic paper product such as liner board, and dried imparts a clear anti-skid or slip resistant coating to the coated cellulosic paper product. More particularly, this invention provides cellulosic sheet material coated with an aqueous emulsion consisting essentially of a polymer of a monovinyl aromatic monomer, the emulsion polymer having a glass transition temperature ($T_g$) of at least about 70° C., and an average particle size in the range of from about 70 to about 150 nanometers (nm). The total solids content of the emulsion used to coat the cellulosic paper product will typically vary from about 30 to about 60 weight percent, preferably from about 40 to about 50 weight percent. The emulsion polymer of the invention preferably has a $T_g$ of from about 70° C. to about 100° C., an average particle size in the range of from about 80 to about 100 nm. The glass transition temperature ($T_g$) of a thermoplastic polymer is the temperature at which the polymer changes from a hard, somewhat brittle form to the beginning of a rather soft, rubbery form.

Monovinyl aromatic monomers suitable for use in preparing the polymer emulsion of the invention include styrene and styrene having alkyl or halogen ring substituents, such as $C_1$–$C_3$ alkyl or chloro substituents, e.g., 2,5-dichlorostyrene, 2,4-dichlorostyrene, 2-chlorostyrene, 3-chlorostyrene, 4-chlorostyrene, 2-methylstyrene, 3-methylstyrene, 4-methylstyrene, 2,4-dimethylstyrene, 3-ethylstyrene, 4-ethylstyrene, 4-isopropylstyrene, and the like. Styrene is preferred for use in the composition of the invention.

In a preferred embodiment, the polymer is a styrene homopolymer or a copolymer of styrene and up to about 15 weight percent, based on the weight of the copolymer, of an alkyl ester of acrylic acid or methacrylic acid, wherein the alkyl ester group contains up to about 10 carbon atoms, e.g., $C_1$–$C_{10}$ alkyl esters, typically $C_1$–$C_4$ alkyl esters. Exemplary alkyl acrylates and methacrylates include methyl acrylate, ethyl acrylate, isopropyl acrylate, butyl acrylate, amyl acrylate, hexyl acrylate, heptyl acrylate, octyl acrylate, decyl acrylate, 2-ethylhexyl acrylate, methyl methacrylate, butyl methacrylate, amyl methacrylate, and the like. Butyl acrylate is preferred. A particularly preferred copolymer for use in accordance with the invention is a copolymer containing from about 85 to about 95 weight percent styrene and from about 15 to about 5 weight percent $C_1$–$C_{10}$ alkyl acrylate, e.g., $C_1$–$C_4$ alkyl preferred copolymer is one containing about 90 weight percent styrene and about 10 weight percent butyl acrylate.

The polymer (or copolymer) emulsions of the invention may be prepared by conventional emulsion polymerization techniques. In a typical polymerization, an aqueous emulsion of the monomer or monomers to be used is prepared by the use of conventional dispersing or emulsifying agents, and the monomer(s) polymerized in the presence of a suitable conventional polymerization catalyst and in the absence of oxygen, e.g., by using an inert gas pad or sparge. Alternatively a preformed polymer or copolymer may be emulsified. The former or emulsion polymerization technique is preferred since it is more easily controllable and permits preparation of a more uniform product.

The dispersing or emulsifying agent(s) used in the preparation of the aqueous polymer emulsions of the invention may be chosen from a wide variety of commercially available materials and include anionic surfactants, non-ionic surfactants and mixtures of anionic and non-ionic surfactants. Anionic surfactants are preferably those having a polyoxyethylene chain of at least 5 oxyethylene units; while non-ionic surfactants are usually composed of a hydrophobic alkyl chain (usually containing 4 to 18 carbon atoms) typically linked to a hydrophilic oxyethylene chain of 5 to 120 oxyethylene units through a phenoxy group. Examples of anionic and nonionic surfactants include the sodium salt of lauryl polyethoxy (50) sulfate, sodium dodecyl benzene sulfonate, sodium lauryl sulfate, and nonylphenyl ether of polyoxyethylene (10.5) glycol. Anionic surfactants favor the preparation of smaller polymer particles, whereas nonionic surfactants favor larger polymer particles. By selecting the amount of nonionic and/or anionic surfactant used, as is known by those skilled in the art, polymer particles within the desired range may be obtained. From about 1 to about 10 weight percent, usually from about 2 to about 6 weight percent of surfactant, basis the weight of the aqueous monomer mixture undergoing polymerization, is typically used.

Polymerization catalysts that may be used in accordance with the invention are the so-called free radical catalysts which include persulfates, e.g., ammonium persulfate, sodium persulfate or potassium persulfate. Hydrogen peroxide, perborates as well as organic peroxides and hydroperoxides may also be used. These include benzoyl peroxide, tertiary butyl hydroperoxide, di-isopropyl benzene hydroperoxide, cumene hydroperoxide, methyl ethyl ketone peroxide, etc. Other free-radical catalysts, such as azobisisobutyronitrite, may also be used. Such catalysts are, of course used in catalytic amounts, which typically range from about 0.01 to about 1.0 weight percent based on the weight of the monomer(s) polymerized.

The polymer product of this invention may be prepared by forming an emulsion of the monomer(s) to be polymerized and adding the preformed emulsion and catalyst separately to a reactor containing water and additional surfactant(s); or by slowly adding the monomer(s) to be polymerized and catalyst to an aqueous polymerization medium containing the surfactant(s). Polymerization may be conducted in stages to attain high conversions of the monomer(s). Polymerization temperatures may range from about 45° C. to 90° C., e.g., 60° C. to 80° C. The aqueous polymer emulsion may have a pH in the acid range, e.g., 2.5-3; however, by the use of appropriate buffering or alkaline agents, the pH may be adjusted if required to from about 4 to 8.5, e.g., 5 to 7. The weight average molecular weight of the polymer is typically in the range of from 200,000 to 500,000.

To enhance the film forming properties of the aqueous polymeric emulsions of the invention, it may, in some instances be desirable to add a plasticizer to the polymer emulsion. Contemplated plasticizers include the lower alkyl, i.e., $C_1$ to $C_4$ alkyl Carbitols, e.g., methyl Carbitol, ethyl Carbitol, and butyl Carbitol, dimethyl phthalate, diethyl phthalate, dibutyl phthalate, and dipropylene glycol monomethyl ether. The Carbitol plasticizers, i.e., the monomethyl ether, monoethyl ether and monobutyl ethers of diethylene glycol are preferred. Such plasticizers may be added to the polymer emulsion in amounts ranging from about 1 to about 4 weight percent, basis the weight of the emulsion polymer.

The aqueous polymer emulsion of the present invention may be used to coat a wide variety of cellulosic sheet materials such as wood, plywood, paper and the like. By the term "paper" is meant cellulosic paper in its usual or ordinary sense, as well as paper of any thickness, which includes paper board, paste board, cardboard, fiber board, liner board, corrugated board, box board, container board and the like.

The invention is further illustrated but is not intended to be limited by the following Examples, in which all parts and percentages are by weight unless otherwise specified.

EXAMPLE 1

An emulsion containing 142.8 parts of deionized water, 10.1 Parts of Siponate ® DS-10 sodium dodecyl benzene sulfonate anionic surfactant and 316.2 parts of monomeric styrene was charged to a reactor containing 180.5 parts of deionized water, 3.4 parts of Siponate ® DS-10 surfactant and 1.0 part of sodium acetate. The monomeric polymer mixture was polymerized in three stages over a period of about 3 hours. The primary initiator was composed of 26.5 parts of deionized water, 1.3 parts of potassium persulfate and 0.5 part of sodium acetate; the delayed initiator was composed of 77.4 parts of deionized water, 2.9 parts of potassium persulfate and 1.0 part of sodium acetate; and the finishing initiator was composed of 11.2 parts of deionized water, 0.5 part of potassium persulfate and 0.5 part of sodium acetate. The resultant polymer emulsion had a total solids content of about 45 weight percent (the balance being water). The emulsion polymer had an average particle size of about 92 nm, and a $T_g$ of about 100° C.

EXAMPLE 2

An emulsion containing 123.4 parts of deionized water, 29.5 parts of Polystep ® B5 sodium lauryl sulfate anionic surfactant, 34.5 parts of butyl acrylate and 287.2 parts of monomeric styrene was charged to a reactor containing 171.8 parts of deionized water, 11.7 parts of Polystep ® B5 surfactant and 0.1 part of sodium bicarbonate. The monomeric polymer mixture was polymerized in three stages. The primary initiator was composed of 26.6 parts of deionized water and 0.5 part of potassium persulfate; the delayed initiator was composed of 77.4 parts of deionized water and 1.5 parts of potassium persulfate; and the finishing initiator was composed of 11.2 parts of deionized water and 0.5 part of potassium persulfate. The resultant polymer emulsion had a total solids content of about 45 weight percent (the balance being water). The emulsion polymer had an average particle size of about 98 nm and a $T_g$ of about 75° C. About 4 weight percent, based on weight of the emulsion polymer, of ethyl Carbitol was added to the finished emulsion.

EXAMPLE 3

The polymer emulsions prepared as described in Examples 1 and 2 were evaluated for slip resistance as follows:

Samples of commercially available liner board made of recycle paper fiber were uniformly coated by spraying to a loading of about 0.04 gram per square inch of the polymer emulsions prepared as described in Examples 1 and 2. The coated liner board samples were secured to the undersurface of weighted glass sheet and to the top surface of an adjustable inclined plane. The weighted glass sheet was placed on the inclined plane such that the liner board surfaces were in contact. The inclined plane was slowly elevated from a horizontal position and the angle of elevation was measured when the glass sheet began to slide down the plane. The angle so determined is the slip angle. A slip angle of 35 degrees was determined for liner board coated with the polymer emulsions of Examples 1 and 2 as compared with a slip angle of 19 to 20 degrees for the uncoated liner board.

Coatings applied to fibrous cellulosic sheet, e.g., liner board, using the polymer emulsions of the invention, in addition to imparting slip resistance to the sheet, also alleviate dusting problems caused by colloidal silica and are much less prone to erosion than are coatings containing colloidal silica.

The polymer emulsions of the invention may be coated on the sheet by any conventional technique, e.g., spraying, brushing, rolling, calendaring or the like. Following application of the aqueous polymer emulsion to the sheet, it may be dried by the application of heat in various ways known in the art, e.g., by exposure to ambient room temperatures or an external heat source. The coating may be continuous or discontinuous. The coatings are typically applied to a dry weight loading of from about 0.004 to about 0.04 grams per square inch of liner board.

Although the invention has been illustrated in some detail by the foregoing Examples, many variations will be apparent to those skilled in the art without departing from the spirit and scope thereof as defined by the appended claims.

I claim:

1. A slip resistant cellulosic sheet article consisting essentially of cellulosic sheet material having an adherent slip-resistant surface coating, said coating consisting essentially of a dried colloidal silica-free aqueous polymer emulsion, said emulsion polymer being monovinyl aromatic monomer polymerizates, having a glass transition temperature of from about 70° C. to about 100° C. average particle size in the range of from about 70 to about 150 nanometers.

2. The article of claim 1 whereas the monovinyl aromatic monomer is styrene, ring-substituted chlorostyrene, or ring-substituted $C_1$-$C_3$ alkyl styrene.

3. The article of claim 1 wherein the monovinyl aromatic monomer polymerizate is a copolymer of styrene and up to 15 weight percent of a $C_1$-$C_{10}$ alkyl ester of acrylic or methacrylic acid.

4. The article of claim 3 wherein the polymerizate is a copolymer of styrene and from 5 to 15 weight percent of a $C_1$-$C_4$ alkyl ester of acrylic acid.

5. The article of claim 4 wherein the acrylic acid ester is butyl acrylate.

6. The article of claim 4 wherein the polymerizate is a copolymer of about 90 weight percent styrene and about 10 weight percent butyl acrylate.

7. The article of claim 1 wherein the polymer has an average particle size of from about 80 to about 100 nanometers.

8. The article of claim 1 wherein the coating has a dry weight loading of from about 0.004 to about 0.04 grams per square inch.

9. The article of claim 1 wherein the aqueous polymer emulsion has a total solid content of from about 30 to about 60 weight percent.

10. The article of claim 1 wherein from about 1 to about 4 weight percent of a plasticizer selected from the group consisting of (a) the monomethyl ether-, monoethyl ether- or monobutyl ether- of diethylene glycol, (b) dipropylene glycol monomethyl ether, and (c) dimethyl-, diethyl- or dibutyl-phthalate is added to the aqueous polymer emulsion.

11. The article of claim 1 wherein the cellulosic sheet material is cellulosic paper.

12. A slip resistant cellulosic sheet article consisting essentially of cellulosic paper having an adherent slip-resistant surface coating, said coating consisting essentially of a dried colloidal silica-free aqueous polymer emulsion, said emulsion polymer being a styrene polymerizate selected from the group consisting of a styrene homopolymer and a copolymer of styrene and 5 to 15 weight percent of a $C_1$-$C_4$ alkyl ester of acrylic or methacrylic acid, said polymerizate having a glass transition temperature of from about 70° C. to about 100° C. and an average particle size in the range of from about 70 to 150 nanometers.

13. The article of claim 12 wherein the emulsion polymer is a copolymer of styrene and 5 to 15 weight percent of a $C_1$-$C_4$ alkyl ester of acrylic acid.

14. The article of claim 12 wherein the cellulosic paper is liner board and the emulsion polymer is a copolymer of about 90 weight percent styrene and about 10 weight percent of butyl acrylate having an average particle size of from about 80 to about 100 nanometers.

15. The article of claim 14 wherein from about 1 to about 4 weight percent of a plasticizer selected from the group consisting of (a) the monomethyl ether-, monoethyl ether- or monobutyl ether- of diethylene glycol, (b) dipropylene glycol monomethyl ether, and (c) dimethyl-, diethyl- or dibutyl-phthalate is added to the aqueous polymer emulsion.

16. The article of claim 12 wherein from about 1 to about 4 weight percent of a plasticizer selected from the group consisting of (a) the monomethyl ether-, monoethyl ether- or monobutyl ether- of diethylene glycol, (b) dipropylene glycol monomethyl ether, and (c) dimethyl-, diethyl- or dibutyl-phthalate is added to the aqueous polymer emulsion.

17. The article of claim 12 wherein the polymer emulsion has a total solids content of from about 30 to about 60 weight percent.

18. The article of claim 12 wherein the coating has a dry weight loading of from about 0.004 to about 0.04 grams per square inch.

19. The article of claim 4 wherein the cellulosic sheet material is liner board.

20. The article of claim 5 wherein the cellulosic sheet material is liner board.

* * * * *